May 17, 1949.  S. G. OLIVARES  2,470,715
ELECTRIC HEATING UNIT
Filed Sept. 27, 1946  2 Sheets-Sheet 1

Inventor
S. G. Olivares
By
Kimmel & Crowell Attys.

May 17, 1949. S. G. OLIVARES 2,470,715
ELECTRIC HEATING UNIT
Filed Sept. 27, 1946 2 Sheets-Sheet 2
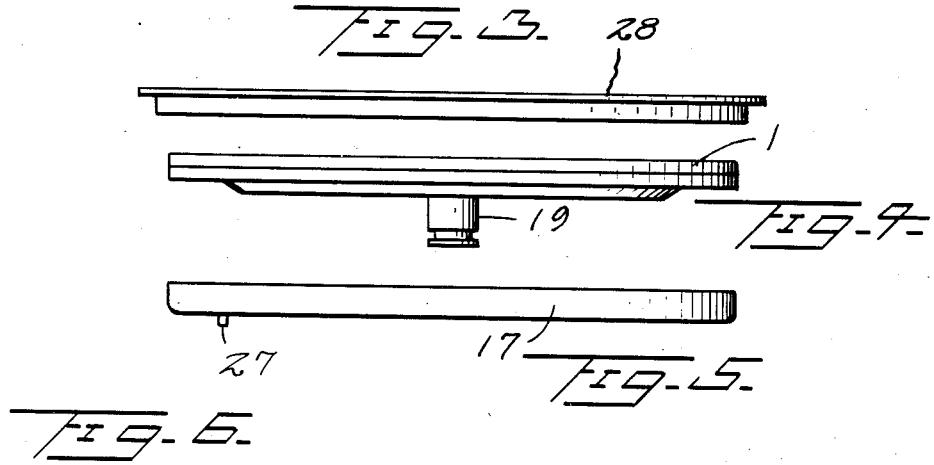
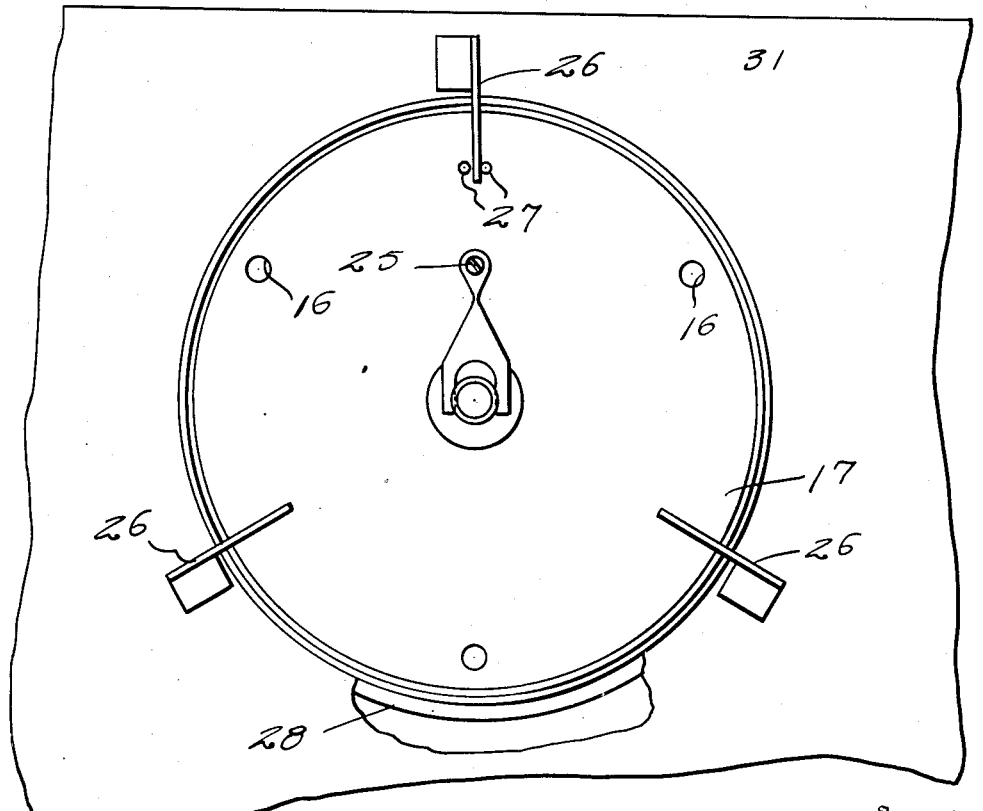
Inventor
S. G. Olivares
By
Kimmel & Crowell Attys.

Patented May 17, 1949

2,470,715

UNITED STATES PATENT OFFICE 2,470,715

ELECTRIC HEATING UNIT

Salvador Guillemin Olivares, Mexico City, Mexico

Application September 27, 1946, Serial No. 699,680
In Mexico September 27, 1945

1 Claim. (Cl. 219—37)

This invention relates to a heating unit of high efficiency to be used mainly in electric stoves.

Stoves in present use are provided with heating units of low efficiency, which due to their design and construction have a useless dispersion of more than fifty per cent of the thermic energy produced by the electric current. The construction of these units does not allow the change of the electric resistance used, and their replacement is costly, as it implies the complete change of the heating unit.

An object of this invention is to provide a highly efficient heating unit, capable of utilizing almost the total of the electric energy used, through the combination of the different emissive powers of the upper and lower plates of the unit.

Another object of this invention is to provide a heating unit, which upper plate under optimum conditions has an emissive power representing ninety percent of the thermic energy generated by the electric resistance.

A further object of this invention is to provide a heating unit, which makes possible its installation in the stove, without having to use insulating devices, as the heat emitted by the lower plate has been reduced to a minimum.

Another object of this invention is to provide a heating element which design and construction allow a uniform distribution of the thermic energy produced.

With the foregoing objects in view, and others which may hereinafter more fully appear, the invention consists of the novel construction, combination and arrangement of parts, as will be more specifically described and illustrated in the accompanying drawings, wherein are shown embodiments of the invention, but it is to be understood that changes, variations and modifications may be resorted to which fall within the scope of the invention as claimed.

In the drawings,

Wherein similar reference characters designate similar parts throughout the respective views, Figure 1 is a vertical section of the heating unit, mounted on supporting brackets and plate.

Figure 3 is a side view of the reflecting annular piece.

Figure 4 is a side view of the heating unit.

Figure 5 is a side view of the supporting plate.

Figure 6 is a bottom plan view of the supporting plate and brackets.

Figures 1, 2:
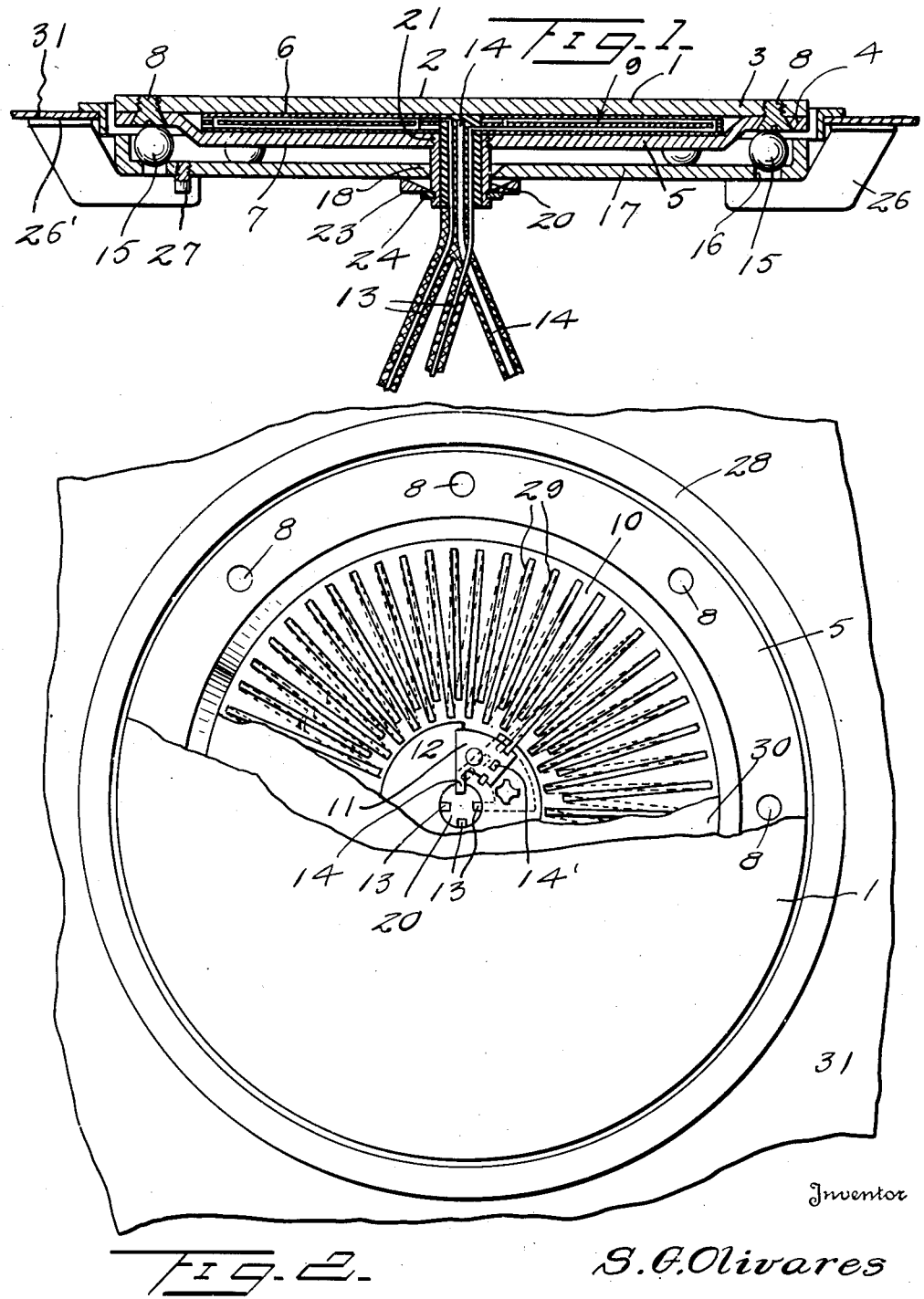
Figure 2 is a top plan view of the heating unit, partially cut away to show the resistance.

Referring to the drawings, the numeral 1, generally designates an upper plate of high emissive power, provided with an outer surface 2, of rough and dull or lusterless finish, to obtain the maximum emission of heat transmitted to said plate by the corresponding heat element.

Plate 1, is fixedly joined at its lower portion 3 to the outer portion of the upwardly projecting rim 4 of lower plate 5. This lower plate of equal diameter as upper plate 1, has a very low emissive power and it is provided with an upwardly projecting rim 4, to form a space 6, where the heating element 9 is located.

The outer surface 7 of lower plate 5, is highly polished with a mirror-like finish, so that its heat emissive power is reduced to a minimum, which may be estimated as five percent of the total thermic energy produced by the heating element. The total and effective joint of the upwardly projecting rim 4 and the inner portion of plate 1, by screws 8, provides the means for the perfect conduction to upper plate 1, of the thermic energy collected by lower plate 5.

In space 6, there is a heating element 9, consisting of a resistance 29, made of nichrome wire or tape, or any other suitable material, radially wound on an insulating disc 10, which fixedly holds it. Said resistance is placed between two electric insulating discs 30, and has two or more separate windings, in order to provide different heat intensities in the stove. The ends of these resistance windings are connected to terminals 11, held at the center 12 of supporting disc 10, and to the stove's electric circuit by means of conductors 13, which are tagged with a number or symbol to allow their correct connection to the circuit, when the heating unit is taken apart for cleaning or replacement. The construction of the heating element provides a uniform generation and distribution of heat in the space formed by the upper and lower plates.

The maximum efficiency of this heating unit has been obtained through the novel and useful combination of a highly emissive surface in the outer portion of upper plate 1, and a non-emissive surface in the outer portion of lower disc or plate 5. In this manner, heat generated by the heating element, is absorbed in equal proportions by plate 1 and plate 5; plate 1, with its rough dull outer surface allows an immediate and total emission of heat, while plate 5, with a highly polished outer surface, only emits from three to five percent of the thermic energy absorbed from the heating element. With plates 1 and 5, firmly joined at its lower portion and upwardly projecting rim 4, respectively, the thermic energy transmitted to lower plate 5, is not accumulated there, but conducted to upper plate 1, which high emissive power provides its immediate and effective dispersion.

Thus practically the total of the thermic energy produced by the heating element is emitted by the upper plate, where it is wanted.

The heating unit formed by the upper plate 1, lower plate 5, and heating element 9, is conveniently supported by three or more insulating pieces 15, of substantially spherical form, placed in the circular openings or concave indentations 16 of supporting plate 17. This supporting plate 17 is provided with a central opening 18, through which a tube 19 downwardly extends. Tube 19, is provided with an insulating seal 20, where conductors 13 pass to connect with terminals 11, and it is threadedly supported at the center of lower plate 5. At its lower end, tube 19 is provided with a pair of partial horizontal indentations, where the arms of a supporting piece 24 fit, keeping the heating unit in a fixed position. This supporting piece 24, is held on supporting plate 17, by a screw 25.

The assembly is conveniently installed in the stove, by means of supporting brackets 26, which also keep the unit in a fixed position, engaging stop pieces 27, which downwardly extend from plate 17.

The heat emission in upper plate 1, is further increased by eliminating any unwanted lateral dispersions, which is accomplished by an annular reflecting piece 28, which reflects to said upper plate, any lateral heat dispersion from the periphery of plates 1 and 5.

Having thus described my invention, what I claim is:

A heating unit comprising a disc-shaped upper plate formed with a non-reflecting upper surface, a disc-shaped lower plate formed with an upwardly offset rim, means securing said plates together, a heating element disposed in the space between said plates, said heating element being formed of radially disposed heating coils, heat insulated means between said element and said plates, supporting means secured to said plates and extending laterally therefrom, and a flanged reflecting rim carried by said supporting means spaced from the marginal edges of said plates, said supporting means including a flanged disc formed with spaced openings, spherical heat insulating members seating in said openings and bearing against the lower side of said lower plate for supporting the latter spaced from the flange of said flanged disc, and radially extending supporting arms carried by said flanged disc.

SALVADOR GUILLEMIN OLIVARES.

REFERENCES CITED

The following references are of record in the file of this patent:

UNITED STATES PATENTS

| Number | Name | Date |
| --- | --- | --- |
| 1,139,076 | Rutenber | May 11, 1915 |
| 1,345,696 | Richardson | July 6, 1920 |
| 2,177,173 | Dadson | Oct. 24, 1939 |
| 2,264,270 | Barnsteiner | Dec. 2, 1941 |
| 2,372,270 | Happe | Mar. 27, 1945 |
| 2,400,672 | Wiegand | May 21, 1946 |